United States Patent [19]

Bristol

[11] 4,295,370

[45] Oct. 20, 1981

[54] CAPACITIVE SCHEME FOR MEASURING THE LEVEL OF A LIQUID

[75] Inventor: Robert G. Bristol, Everett, Mass.

[73] Assignee: Emhart Industries, Inc., Indianapolis, Ind.

[21] Appl. No.: 169,819

[22] Filed: Jul. 17, 1980

Related U.S. Application Data

[63] Continuation of Ser. No. 19,653, Mar. 12, 1979, abandoned.

[51] Int. Cl.³ .............................................. G01F 23/26
[52] U.S. Cl. .................................... 73/304 C; 361/284
[58] Field of Search ...................... 73/304 C; 340/620; 361/284

[56] References Cited

U.S. PATENT DOCUMENTS

| | | | |
|---|---|---|---|
| 2,691,223 | 10/1954 | Oberlin | 361/284 X |
| 2,741,124 | 4/1956 | Myers | 361/284 X |
| 3,230,770 | 1/1966 | Hermanson | 361/284 X |
| 3,376,746 | 4/1968 | Roberts | 73/304 C |
| 3,492,440 | 1/1970 | Cerbone et al. | 324/61 R X |
| 3,498,131 | 3/1970 | Rickey | 340/620 X |
| 3,935,739 | 2/1976 | Ells | 73/304 C |
| 3,991,614 | 11/1976 | Ditzler | 73/304 C X |
| 4,083,038 | 4/1978 | Klebanoff | 73/304 C X |
| 4,099,167 | 7/1978 | Pomerantz et al. | 340/620 |
| 4,145,927 | 3/1979 | Larson | 73/304 C |
| 4,177,421 | 12/1979 | Thornburg | 324/61 R |
| 4,209,740 | 6/1980 | Marthe et al. | 73/304 C X |
| 4,212,202 | 7/1980 | Schmidt | 361/284 X |

Primary Examiner—Daniel M. Yasich
Attorney, Agent, or Firm—Robert F. Meyer; David W. Gomes

[57] ABSTRACT

A plurality of conductive strips are situated on a receptacle for receiving a liquid which at least partially comprises dielectric material. A first electrode is commonly situated in spaced relation to each of the conductive strips and provides an electrical signal which is capacitively transmitted between the electrode and each of the conductive strips. A second electrode is commonly situated in spaced relation to each of the conductive strips and the electrical signal is capacitively transmitted between each conductive strip and the second electrode. The electrical signal being capacitively transmitted is modified as the liquid comes in proximity to each conductive strip whereby the level of the liquid is detected.

1 Claim, 6 Drawing Figures

CAPACITIVE SCHEME FOR MEASURING THE LEVEL OF A LIQUID

This application is a continuation of application Ser. No. 19,653, filed Mar. 12, 1979 now abandoned.

The present invention relates to an apparatus for measuring the level of a liquid and more specifically to a capacitive scheme for measuring the level of a liquid which utilizes a plurality of conductive strips and electrodes arranged such that an electrical signal is capacitively transmitted therebetween.

Generally speaking, the apparatus of the present invention includes two or more strips of conducted material situated on a receptacle made of dielectric material for receiving a liquid and two electrodes situated in spaced relation to the conductive strips so that an electrical signal applied to one of the electrodes is capacitively transmitted between the electrode and each conductive strip and is further capacitively transmitted between each conductive strip and the other electrode. The progressive attenuation of the electrical signal amplitude due to the proximity of the liquid at each conductive strip is detectable as indicative of the liquid level.

Capacitive schemes for measuring the level of a liquid are generally known in the art and, as taught in U.S. Pat. No. 4,099,167 issued July 4, 1978, have included the disposition of conductive strips and electrodes on a surface of a receptacle or container to capacitively transmit an electrical signal and thereby detect the level of the liquid in the receptacle. However, as evidenced by the apparatus disclosed in U.S. Pat. No. 4,099,167, prior capacitive schemes for measuring multiple levels of a liquid have required a separate detection electrode and detection circuitry for each level of the liquid desired to be measured. Accordingly, the levels of a liquid have heretofore been discretely measured by utilizing individual drive and/or sense circuits thereby preventing a multiplexed arrangement of liquid level sensors and other capacitive sensors utilizing the same circuitry.

The present invention provides a capacitive scheme for a continuum measurement of liquid levels. The same detection circuitry is also adaptable for discretely indicating specific levels such as an empty container or an overflow condition.

One aspect of the present invention is to provide an apparatus for capacitively measuring the level of a liquid which is simple, requires less circuitry for operation, and is therefore less expensive than capacitive schemes heretofore known in the art. Another aspect of the present invention is the utilization of a single detection electrode situated on a receptacle for receiving a liquid to detect multiple levels of the liquid. Yet another aspect is the measurement of each level of the liquid in a continuum as opposed to discrete measurements of each level and in accordance therewith the ability to multiplex a plurality of liquid level sensors and a plurality of other capacitive sensors utilizing the same detection and drive circuitry. Still another aspect is the adaptability of the present invention to discretely indicate specific levels of the liquid e.g. an empty or overflow condition.

Other features and advantages of the present invention will be apparent from the following detailed description of a preferred embodiment thereof, which description should be considered in conjunction with the accompanying drawings in which.

In referring to the FIGURES, it should be noted that the thicknesses of the walls and various materials disposed thereon relative to the overall dimensions of the apparatus have been greatly exaggerated for the purpose of clarity.

Described hereinafter are embodiments of an apparatus for measuring various levels of a liquid in a continuum wherein an electrical signal commonly associated with each level to be measured is continually modified as the liquid reaches each level. The configurations of the apparatus of the present invention shown in the various FIGURES include a sensing electrode 20, 66, 96, and 120 common to each level to be measured or sensed so that the distinction between levels is discernable by referring to variations in the electrical signal capacitively transmitted between a drive electrode 22, 68, 98, and 122 and the sensing electrode. Opposed to this method of measuring the level of a liquid is the use of discrete sensing elements and discrete capacitively transmittal signals each of which are individually modified and detected as the liquid reaches each level to be measured.

Figure 1:
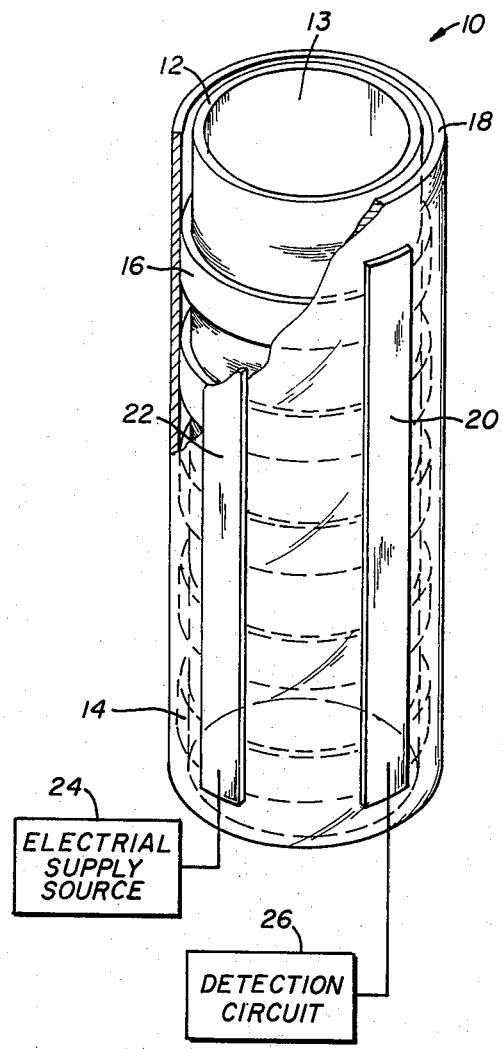
FIG. 1 is a partially sectioned isometric view of an embodiment of the apparatus of the present invention.

Referring to FIG. 1, one embodiment of an apparatus 10 for measuring the level of a liquid in a continuum includes a receptacle 12 for receiving a liquid (not shown) which is constructed of a dielectric material e.g. plastic, having at least one open end 13 through which the liquid is receivable. It should be noted that although the shape of the receptacle is shown to be cylindrical it may be any shape without departing from the spirit of the present invention. Furthermore, it will be understood that the liquid may enter the receptacle 12 either from its bottom or top and that if a filler neck were provided in the bottom of the receptacle 12 both the top and bottom of the receptacle may be open. Further included in apparatus 10 are at least two strips 14 and 16 of any conventional electrically conductive material which are adhered to the outer surface of receptacle 12 and as shown completely circumscribe the cylindrical shape thereof. However, as will be apparent, it is not necessary that the strips completely circumscribe the receptacle. Importantly, it should be noted that the advantages associated with the present invention are augmented as the number of levels to be measured increases. Accordingly, as shown, a plurality of conductive strips may be interposed between conductive strips 14 and 16 and adhered to the outer surface of the receptacle 12 in order to measure more than two liquid levels. An insulative material 18 covers each conductive strip 14 and 16 so that a drive electrode 22 is situated on the outer surface of the receptacle 12 in spaced relation and substantially perpendicular to each of the conductive strips 14 and 16. An electrical signal provided by an electrical supply source 24 when applied to electrode 22 is therefore capacitively transmitted between electrode 22 and each of the conductive strips 14 and 16. A sense electrode 20 is also situated on the outer surface of the receptacle 12 in spaced relation and substantially perpendicular to each of the conductive strips 14 and 16 so that the electrical signal provided by electrical supply source 24 is further capacitively transmitted between each of the conductive strips 14 and 16 and the electrode 20. Accordingly, electrode 20 is common to each conductive strip 14 and 16 and in the absence of the liquid has an electrical signal associated therewith determined by the parallel combination of a plurality of capacitors representative of the various levels of the liquid to be measured. A detection circuit 26 electrically coupled to the sense electrode 20 detects the capacitively transmitted electrical signal in a continuum and, as the signal is continually modified by the presence of the liquid in proximity to each conductive strip 14 and 16, the circuit 26 will indicate a particular level of the liquid. By utilizing the individual strips 14 and 16 and properly spacing each strip from the other, a continuous linear response is achieved. If a single continuous strip were used in place of the individual strips 14 and 16 a continuous non-linear response would result. Furthermore, the spacing between the strips 14 and 16 must not be too great or discrete signals are produced.

Figure 2:
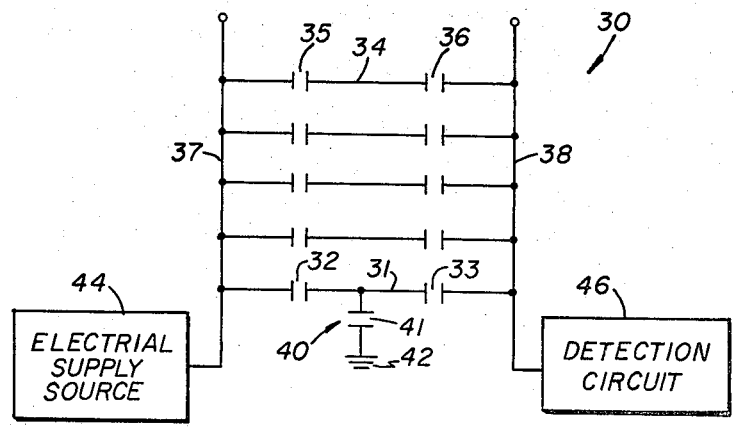
FIG. 2 is an equivalent electrical circuit of the embodiments of the present invention.

The operation of each of the embodiments illustrated in the FIGURES can best be described using an equivalent electrical circuit 30 such as the one shown in FIG. 2. Referring to FIG. 2, each conductive strip 31 and 34 has associated therewith two capacitors 32, 33 and 35, 36 respectively which are formed by drive electrode 37 and sense electrode 38. The electrical signal provided to drive electrode 37 by electrical supply source 44 is capacitively transmitted to the sense electrode 38 through capacitors 32, 33, 35, and 36. Capacitors 35 and 36 are electrically coupled in parallel with capacitors 32 and 33. It will be understood that each level of the liquid to be measured will have two capacitors formed by the conductive strip associated with such level and the drive electrode 37 and sense electrode 38 and that those two capacitors will capacitively transmit the electrical signal provided by electrical supply source 44 between electrodes 37 and 38 in parallel with each other pair of capacitors associated with each level to be measured. The capacitively transmitted signal is continuously detected by a detection circuit 46 for all levels of the liquid to be detected. As the liquid (identified by the numeral 40 in FIG. 2) is presented in proximity to a conductive strip 31, the electrical signal capacitively transmitted to electrode 38 is modified because a portion of such electrical signal is shunted to ground potential 42 (the liquid is grounded) through a capacitance 41 formed between the liquid and the conductive strip 41. As the liquid 40 continues to rise in proximity to each conductive strip 34 more and more of the electrical signal capacitively transmitted between electrode 37 and 38 is shunted through the liquid to ground potential 42 and the electrical signal is therefore continuously modified. With each modification of the electrical signal, detection circuit 46 detects the liquid level represented thereby. Accordingly, a single sense electrode 38 and detection circuit 46 are capable of measuring a plurality of liquid levels.

Figure 3:
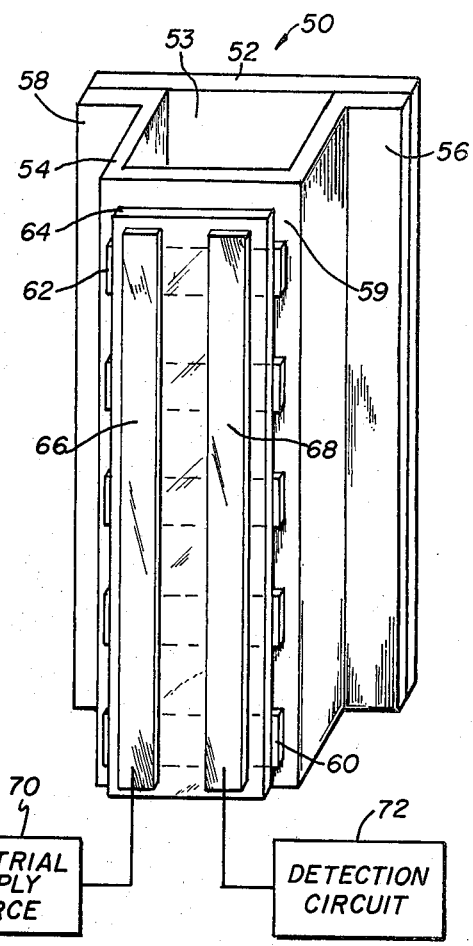
FIG. 3 is an isometric view of another embodiment of the apparatus of the present invention.

Referring to FIG. 3, another embodiment of an apparatus 50 for measuring the level of a liquid in a continuum which operates substantially as described hereinabove, includes a receptacle 52 having a substantially rectangular portion 54 for receiving a liquid (not shown) and flanges 56 and 58 protruding from the rectangular portion 54 for mounting the receptacle 52 to a support apparatus (not shown). The receptacle 52 is again constructed of a dielectric material and has at least one open end 53 through which the level is receivable. As previously indicated, receptacle 52 may also be provided with a filler neck (not shown) located in the bottom of the receptacle 52 through which the liquid may be caused to flow into the receptacle 52. At least two strips 60 and 62 of any conventional electrically conductive material are adhered to an outer surface of a wall 59 of the rectangular portion 54 of receptacle 52. Again numerous other conductive strips may be interposed between strips 60 and 62 in order to measure more than two liquid levels. Covering each conductive strips 60 and 62 on the outer surface of the wall 59 is an insulative material 64 which separates the conductive strips 60 and 62 from drive electrode 66 and sense electrode 68. The spaced relation of electrode 66 and the conductive strips 60 and 62 forms a capacitance therebetween for capacitively transmitting an electrical signal provided by electrical supply source 70. The spaced relation of electrode 68 and the conductive strips 60 and 62 also forms a capacitance for capacitively transmitting the electrical signal therebetween. Electrode 68 is common to each conductive strip 60 and 62 and in the absence of the liquid has an electrical signal associated therewith determined by the parallel combination of capacitors representative of the various levels of the liquid to be measured. A detection circuit 72 electrically coupled to the sense electrode 68 continuously detects the electrical signal. As the signal is continuously modified by the presence of the liquid in proximity to each conductive strip 60 and 62, the circuit 72 will indicate a particular level of the liquid.

Figures 4, 5:
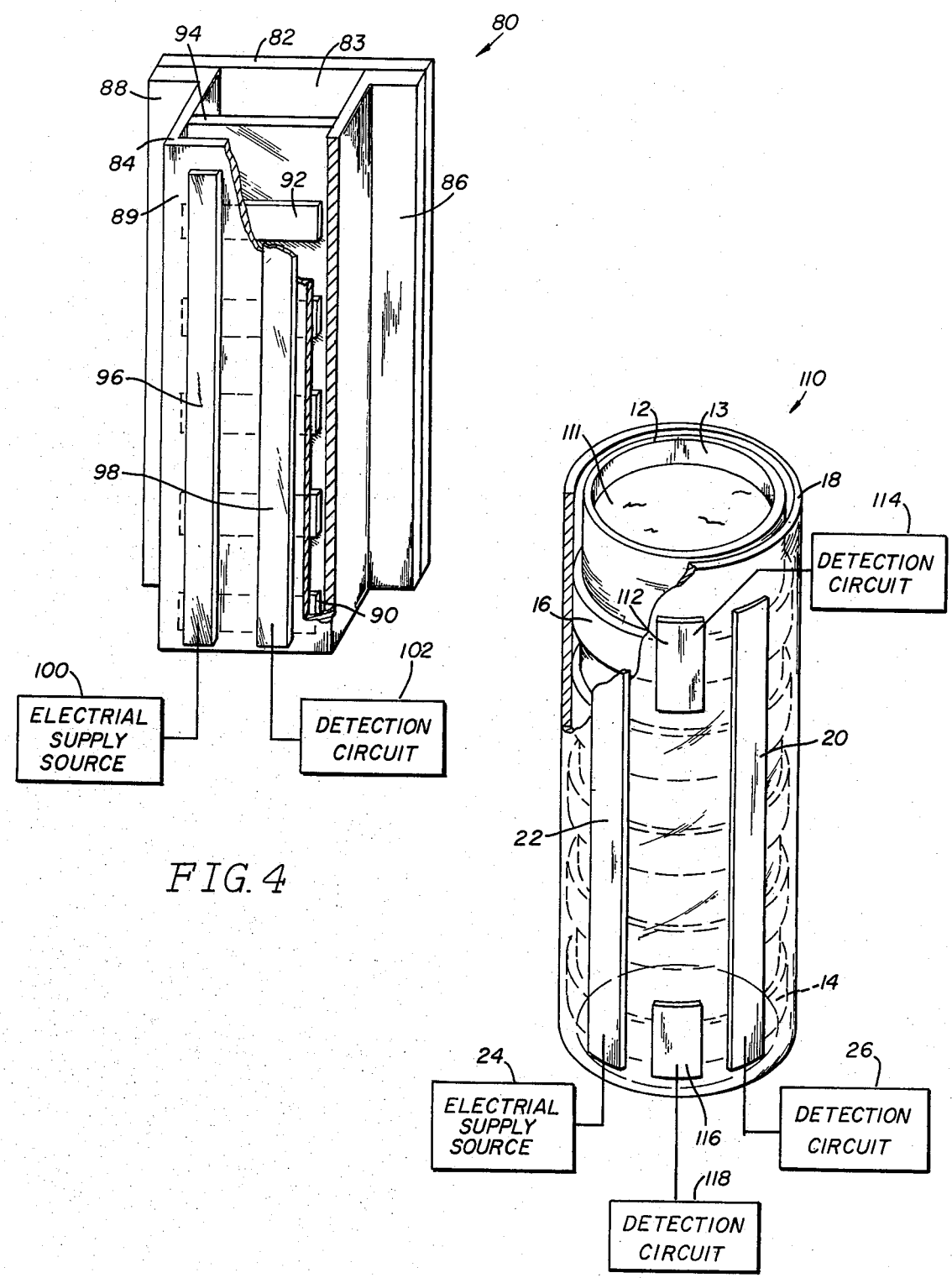
FIG. 4 is a partially sectioned isometric view of another embodiment of the apparatus of the present invention.
FIG. 5 is a partially sectioned isometric view of the embodiment shown in FIG. 1 adapted for detecting specific levels of a liquid.

Referring to FIG. 4, a further embodiment of an apparatus 80 for measuring the level of a liquid in a continuum which operates substantially as described hereinabove includes a receptacle 82 having a substantially rectangular portion 84 for receiving a liquid (not shown) and flanges 86 and 88 protruding from the rectangular portion 84 for mounting the receptacle 82 to a support apparatus (not shown). Receptacle 82 is likewise constructed of a dielectric material and has at least one open end 83 through which the liquid is receivable, although, a filler neck may be provided in the bottom of the receptacle 82 in the manner previously described. At least two strips 90 and 92 of any conventional electrically conductive material are adhered to an inner surface of a wall 89 of the rectangular portion 84 of receptacle 82. As described before; numerous other conductive strips may be interposed between strips 90 and 92 in order to measure more than two liquid levels. Covering each conductive strip 90 and 92 on the inner surface of the wall 89 is an insulative material 94 which separates the conductive strips 90 and 92 from the liquid as it is provided in proximity to each strip 90 and 92. The spaced relation between the conductive strips 90 and 92 and the liquid in proximity thereto forms a capacitance between the liquid and each conductive strip 90 and 92 in proximity to the liquid. A drive electrode 96 and a sense electrode 98 are situated on an outer surface of wall 89 and are therefore separated from the conductive strips 90 and 92 by the dielectric material of wall 89. Accordingly, a capacitance is established between drive electrode 96 and conductive strips 90 and 92 and a capacitance is likewise established between the conductive strips 90 and 92 and the sense electrode 98 whereby an electrical signal provided by an electrical supply source 100 to drive electrode 96 is capacitively transmitted between drive electrode 96 and sense electrode 98. As in the previously described embodiments, sense electrode 90 is common to each conductive strip 90 and 92 and therefore in the absence of the liquid the electrical signal capacitively transmitted thereto is determined by the parallel combination of capacitors representative of the various levels of the liquid to be measured. A detection circuit 102 electrically coupled to the sense electrode 98 detects the level of the liquid in the continuous manner previously described.

Illustrated in FIG. 5 is an apparatus 110 for measuring various levels of a liquid 111 which is physically constructed and operates similar to the apparatus 10 shown in FIG. 1, but which is further adapted for indicating specific levels or conditions of the liquid in addition to measuring the normal liquid levels. Accordingly, corresponding reference characters in FIG. 5 indicate corresponding parts in FIG. 1 and therefore such parts which have heretofore been described are only discussed hereinafter as they relate to the improvements shown in FIG. 5. Referring to FIG. 5, it may be desirable to indicate that the receptacle 12 is empty or that a flood condition exists, where the liquid 111 is above to overflow the receptacle 12, in addition to measuring the various levels of the liquid 111. Furthermore, it may be desirable that in response to such conditions or levels of the liquid an event should occur such as the opening of a valve, relay etc. Accordingly, in addition to measuring the levels of the liquid 111 in a continuum using one sense electrode 20 and one detection circuit 26 as previously described, the apparatus 110 is adaptable to discretely indicate specific conditions or levels of the liquid 111. An electrode 112 having its own detection circuit 114 associated therewith is situated in spaced relation to a single conductive strip 16, being separated therefrom by the insulative layer 18, whereby the electrical signal provided by electrical supply source 24 is further capacitively transmitted between drive electrode 22 and electrode 112. When the liquid 111 is provided in proximity to conductive strip 16 the level of the liquid 111 is detected by detection circuit 26 through sense electrode 20 and a flood condition is indicated by detection circuit 114 through electrode 112. Another electrode 116 having its own detection circuit 118 associated therewith is situated in spaced relation to another single conductive strip 116, again being separated therefrom by the insulative layer 18, whereby the electrical signal provided by electrical supply source 24 is further capacitively transmitted between drive electrode 22 and electrode 116. In the absence of the liquid 111 in proximity to conductive strip 14 an empty receptacle 12 is indicated by detection circuit 118 through electrode 116. Importantly, it should be noted that the detection circuits 114 and 118 may be individual electrical supply sources and that therefore the common detection circuit 26 may also be utilized to discretely detect the flood condition or the empty receptacle. In order to operate properly, it is only necessary that the electrodes 112 and 116 either have associated therewith individual supply sources or individual detection circuits but not both.

It will be understood by those skilled in the art that the improvements illustrated in FIG. 5 for indicating specific conditions or levels of the liquid may be adapted to each of the other embodiments shown in FIGS. 3, 4, and 6 in a manner similar to that described hereinabove.

Figure 6:
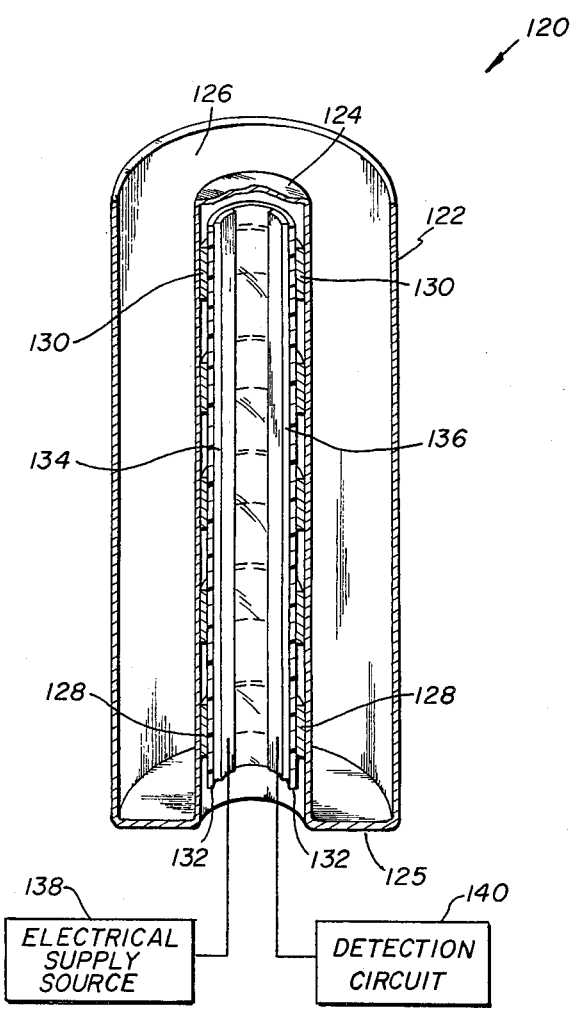
FIG. 6 is a partially sectioned isometric view of another embodiment of the apparatus of the present invention.

Referring to FIG. 6, a further embodiment of an apparatus 120 for measuring the level of a liquid in a continuum which also operates substantially as heretofore described includes a receptacle 122 for receiving a liquid (not shown) wherein the receptacle 122 has a dielectric portion 124 protruding upwardly from its bottom 125 forming a hollow post within the receptacle. The receptacle has at least one open end 126 through which the liquid is receivable, although, as previously indicated, a filler neck may be provided in the bottom 125 of the receptacle 122. At least two strips 128 and 130 of any conventional electrically conductive material are adhered to the dielectric portion 124 of the receptacle 122 on a surface exterior to the liquid (not shown). Again, numerous other conductive strips may be interposed between strips 128 and 130 in order to measure more than two liquid levels. Disposed over the conductive strips 128 and 130 on the exterior or outer surface of the dielectric portion 124 is an insulative material 132 which separates the conductive strips 128 and 130 from drive electrode 134 and sense electrode 136. The spaced relation of electrode 134 and the conductive strips 128 and 130 forms a capacitance therebetween for capacitively transmitting an electrical signal provided by electrical supply source 138. The spaced relation of electrode 136 and the conductive strips 128 and 130 also forms a capacitance for capacitively transmitting the electrical signal therebetween. As in the previous embodiments the sense electrode 136 is common to each conductive strip 128 and 130. A detection circuit 140 electrically coupled to the sense electrode 136 continuously detects the electrical signal. As the signal is continuously modified by the presence of the liquid in proximity to each conductive strip 128 and 130, the circuit 140 will indicate a particular level of the liquid.

What is claimed is:

1. Apparatus for measuring the level of a liquid comprising:

a generally cylindrical receptacle for receiving said liquid, said receptacle having a generally concentric cylindrical portion extending substantially therethrough and being made of dielectric material;

a plurality of electrodes located within said cylindrical portion and against said dielectric material, each of said electrodes being situated at a different vertical level for said liquid in said receptacle;

a drive electrode means located within said cylindrical portion for capacitively coupling an electrical signal to said plurality of electrodes;

a layer of insulation mounted between said drive electrode means and each of said electrodes of said plurality of electrodes for forming signal transmitting capacitance therebetween;

an electrical supply means connected to said drive electrode means for supplying said electrical signal thereto;

means for capacitively shunting said electrical signal through said dielectric portion of said receptacle and any liquid in said receptacle and away from said plurality of electrodes, the amount of signal shunted being dependent upon the amount of said liquid in said receptacle;

detection electrode means mounted adjacent said plurality of electrodes and separated therefrom by said layer of insulation for capacitively receiving said electrical signal from said plurality of electrodes; and a single measuring circuit means connected to said detection electrode means for measuring the amount of signal transmitted to said circuit means from all of said plurality of electrodes, said amount of signal transmitted to said circuit means being responsive to said amount of signal shunted by said means for capacitively shunting and thereby being responsive to the amount of said liquid in said receptacle, said measuring circuit means thereby being adapted for measuring the amount of said liquid in said receptacle.

* * * * *